United States Patent [19]

Misukanis et al.

[11] Patent Number: 5,588,140

[45] Date of Patent: Dec. 24, 1996

[54] TRANSPARENT EXTENSION OF PERIPHERAL FROM HOST

[75] Inventors: Eugene D. Misukanis, Little Canada; John H. Long, Richfield; Lawrence A. Dean, Vadnais Heights; Douglas J. Kuligowski, Brooklyn Park, all of Minn.

[73] Assignee: Computer Network Technology Corporation, Minneapolis, Minn.

[21] Appl. No.: 31,543

[22] Filed: Mar. 15, 1993

[51] Int. Cl.$^6$ .......................... G06F 9/455; G06F 13/00; G06F 15/00

[52] U.S. Cl. .................. 395/500; 364/228.4; 364/228.5; 364/232.3; 364/239.9; 364/243.41; 364/DIG. 1

[58] Field of Search ................................. 395/325, 200, 395/500, 285, 286, 280, 309

[56] References Cited

U.S. PATENT DOCUMENTS

| | | | |
|---|---|---|---|
| 4,312,065 | 1/1982 | Ulug | 370/94.2 |
| 4,468,730 | 8/1984 | Dodd et al. | 395/425 |
| 4,651,316 | 3/1987 | Kocan et al. | 370/85.7 |
| 4,665,516 | 5/1987 | Middleton et al. | 370/76 |
| 4,727,512 | 2/1988 | Birkner et al. | 395/500 |
| 4,916,605 | 4/1990 | Beardsley et al. | 395/425 |
| 5,062,059 | 10/1991 | Youngblood et al. | 395/275 |
| 5,218,691 | 6/1993 | Tuma et al. | 395/500 |

*Primary Examiner*—Kevin J. Teska
*Assistant Examiner*—Ayni Mohamed
*Attorney, Agent, or Firm*—Schwegman, Lundberg, Woessner & Kluth, P.A.

[57] ABSTRACT

A system for extending a communications link between a host computer and peripheral device provides true emulation of the peripheral data storage device. The system includes a host extender for communicating directly with the host computer and a peripheral extender for communicating directly with the peripheral device. The host attached and peripheral extenders communicate across the extended communications link. The host extender initially transmits a channel program to the peripheral extender. The system uses the channel program to obtain format information of a particular track of the peripheral device. The host extender stores this format information and uses it to emulate the peripheral device to the host computer.

13 Claims, 13 Drawing Sheets

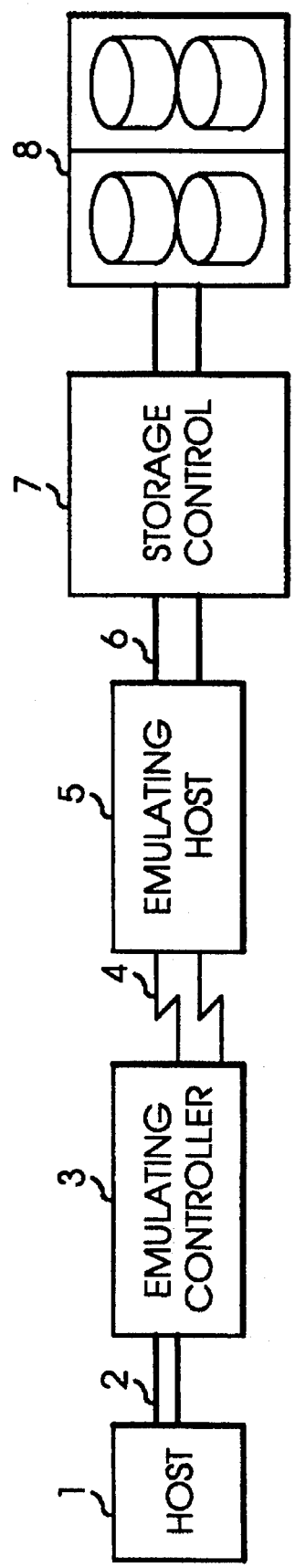

TRANSPARENT EXTENSION OF PERIPHERAL FROM HOST

FIELD OF THE INVENTION

The present invention relates to a system and method for transparent extension of a peripheral data storage device from a host computer.

BACKGROUND OF THE INVENTION

It is sometimes desirable to locate a host computer and a peripheral data storage device at great distances from one another. For example, the host computer and data storage device may be located in different buildings or cities. For communication protocols which include repetitive command-acknowledge cycles, or "handshaking," the host and peripheral must be relatively close together to operate at acceptable speeds. As the distance between the host and peripheral increases, the round trip propagation time of each command-acknowledge cycle also lengthens, to the point where this cycle time is too long for efficient and useful data transfer. In addition, lengthening the distance between the host and peripheral beyond certain limits creates timing problems resulting in desynchronization of the protocol and associated data transfer, resulting in data transfer failures. Where the distance between host and peripheral is too great to maintain acceptable speed of operation or to maintain synchronization, a special interface system is required. Such interface systems, sometimes called extended communications channels, include end-to-end systems, pipelining systems and command batching systems.

An end-to-end system uses two buffers, one for the host and another for the peripheral device. The buffers act as speed matching buffers and receive commands or data and transmit it across the extended communications channel to the other buffer. In this type of system, standard protocol is followed such that a "handshake" requires a command to travel from the host through both buffers to the peripheral before a response from the peripheral is transmitted back through the buffers to the host. During the round-trip time, the host cannot advance the protocol. Therefore, this system has limited speed in responding to commands from the host and in transmitting commands and data between the host and peripheral.

A pipelining system improves upon the end-to-end system by providing increased speed of response. The pipelining system also uses two buffers on the extended communications channel. A host buffer receives commands from the host and immediately sends a response. In return, the host can continue sending commands to the host buffer before those commands are transmitted to the peripheral through the other buffer. The host buffer also sequentially transmits those commands to the peripheral while it receives more commands from the host. Flow control software determines when the host buffer will stop receiving commands to avoid getting a backlog of stored commands. After the host buffer transmits a sufficient number of commands to the peripheral and receives responses, the host buffer will then again accept more commands or data from the host. The pipelining system, however, does not alter protocol in any way and is thus limited in its ability to improve speed of transfer.

A batching system stores a block or batch of contiguous host commands in a host buffer. The host buffer then transmits the stored batch of commands to a peripheral buffer, and receives responses from the peripheral. These responses are then transmitted back to the host and are the actual responses of the peripheral. The system must wait for responses to each transmitted block of commands before it can send responses back to the host.

Yet other extended communications channels are implemented as modifications to the standard host I/O software. These types of systems are undesirable because of risk to software stability and because they can degrade performance of the system by utilizing memory and CPU time. Also, customizing standard software creates special and undesirable software maintenance problems.

A need thus exists for an extended communications system that provides enhanced data transfer speed and which does not require modifications to the host software.

SUMMARY OF THE INVENTION

The present invention is an extended communications system adapted specifically for IBM computers and IBM I/O protocols, but applicable to other computers and protocols. The system includes a host extender coupled between a host computer and a communications link and a peripheral extender coupled between a peripheral device and the communications link. The host extender and peripheral extender communicate with each other and the host and peripheral, respectively, in order to facilitate high speed data exchange in response to channel commands from the host. In one mode of operation, in which data is written from the host to a peripheral storage device, the host extender receives an initial seek command from the host and transmits it in conjunction with subsequent other channel commands to the peripheral extender over the communications link. The peripheral extender conveys the seek command and subsequent other channel commands to the targeted peripheral storage device to obtain the data format of the track specified in the seek command.

The peripheral extender next transmits the data format of the peripheral device to the host extender. Using the data format information, the host extender can emulate certain operations of the peripheral device while communicating with the host computer. For example, upon receiving a search ID equals command, the host extender emulates a spinning disk of the peripheral by using the format information. If necessary, the host extender can generate additional channel programs to obtain data formats of additional tracks of the peripheral device. This emulation allows certain sequences of host-peripheral commands to be performed (emulated) locally between the host extender and the host, thus avoiding the delays encountered if such communications traverse the extended communications link.

These and other features of the invention shall be discussed and described in more detail below.

BRIEF DESCRIPTION OF THE DRAWINGS

FIG. 1A is an overview block diagram of the hardware of the system according to the present invention.

DETAILED DESCRIPTION OF THE PREFERRED EMBODIMENT

Figure 1B:
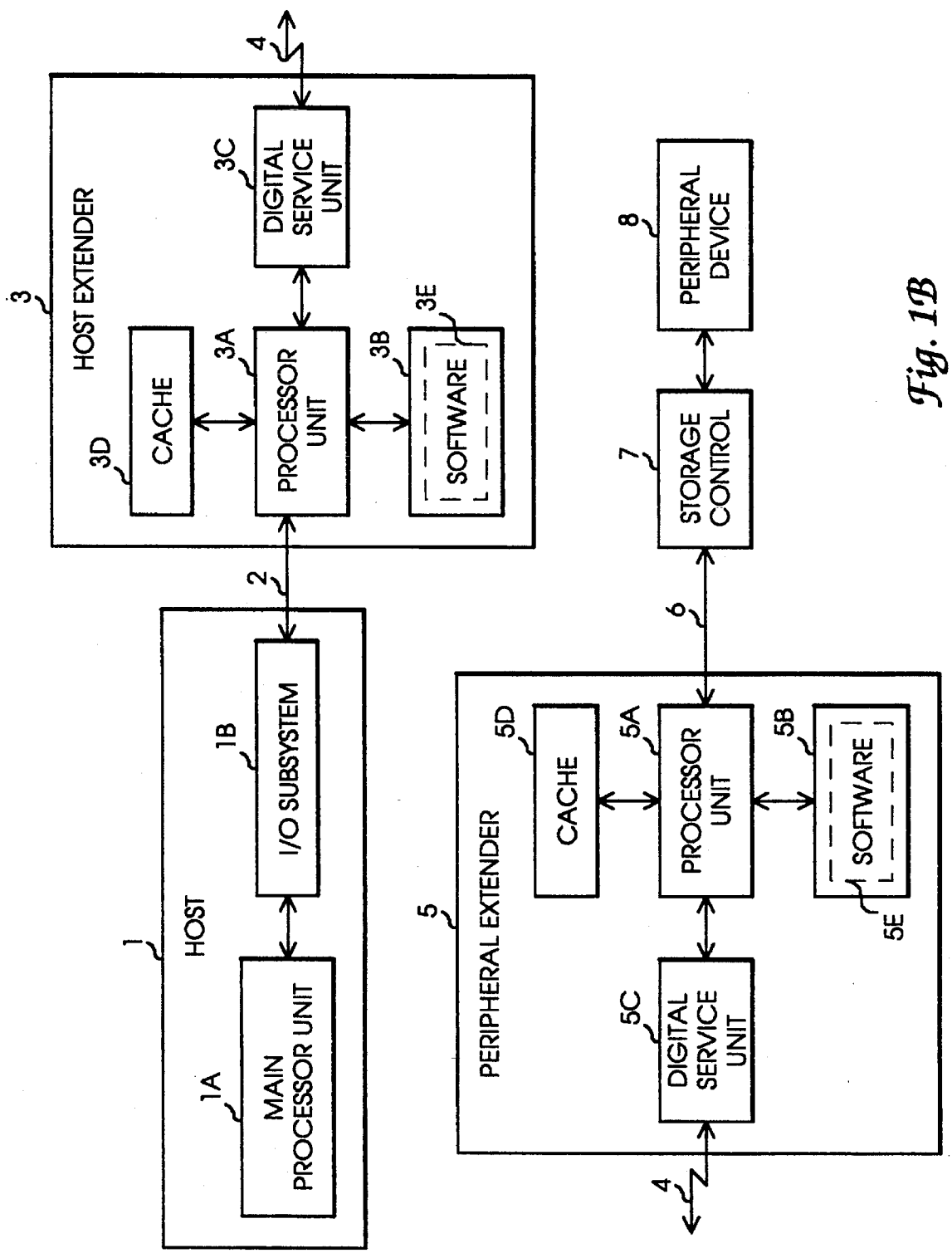
FIG. 1B is a more detailed block diagram of the hardware of the system according to the present invention.

In the following detailed description of the preferred embodiment, reference is made to the accompanying drawings which form a part hereof and in which is shown by way of illustration an exemplary embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

OVERVIEW

FIG. 1A is a block diagram of the system hardware according to the present invention. The system includes a host extender 3, an extended communications link 4, and a peripheral extender 5, connecting a host computer 1 and a peripheral storage device 8. The peripheral device 8 is typically a disk drive; the present invention can also function with other types of storage devices, such as laser disks, worm drives, or tape drives. The term "disk drive" as used in the present specification means a magnetic, laser, or other disk-type storage device.

Host extender 3 communicates directly with the host computer over cables 2. Peripheral extender 5 communicates over cables 6 with a control device 7 for the peripheral storage device 8. Host extender 3 and peripheral extender 5 are "transparent." In other words, they permit host 1 to perform all I/O to peripheral 8 in its native mode. Link 4 may be thousands of miles long, through a telephone network or other connection. Link 4 may comprise a fiber optic cable, copper wire, microwave transmission, any combination of these or other transmission mediums. In this example, the communications link 4 is a long distance telephone line. In the case where link 4 is a telephone line (or other links as well), extenders 3 and 5 include modem or digital interface equipment (e.g. digital service units). Thus, the extended communications system of the present invention allows, for instance, a host computer to access a data storage device located in a different building, city, or even country. In the exemplary preferred embodiment described herein host computer 1 is an IBM mainframe or minicomputer, and peripheral 8 is a Direct Access Storage Device (DASD).

FIG. 1B illustrates host 1, host extender 3, and peripheral extender 5 in more detail. Host 1 includes a main processor 1A and an I/O subsystem 1B which handles I/O requests from the main processor 1A. In response to I/O requests, I/O subsystem 1B processes channel programs comprising a sequence of channel command words (CCW's), and executes these programs to control and exchange data with storage control 7/peripheral device 8. Host extender 3 includes a processor unit 3A which executes software 3E held in local storage 3B, and a cache storage 3D for holding data such as commands and read and write data travelling between host 1 and peripheral extender 5. Host extender 3 further includes a digital service unit 3C that is connected to telephone line 4 and is used for sending and receiving data. Peripheral extender 5 also includes a digital service unit 5C. Extender 5 further includes a processor unit 5A connected to local storage 5B holding software 5E. A cache 5D is also provided to hold data and commands passing between storage control 7 and host extender 3.

Figure 2A:
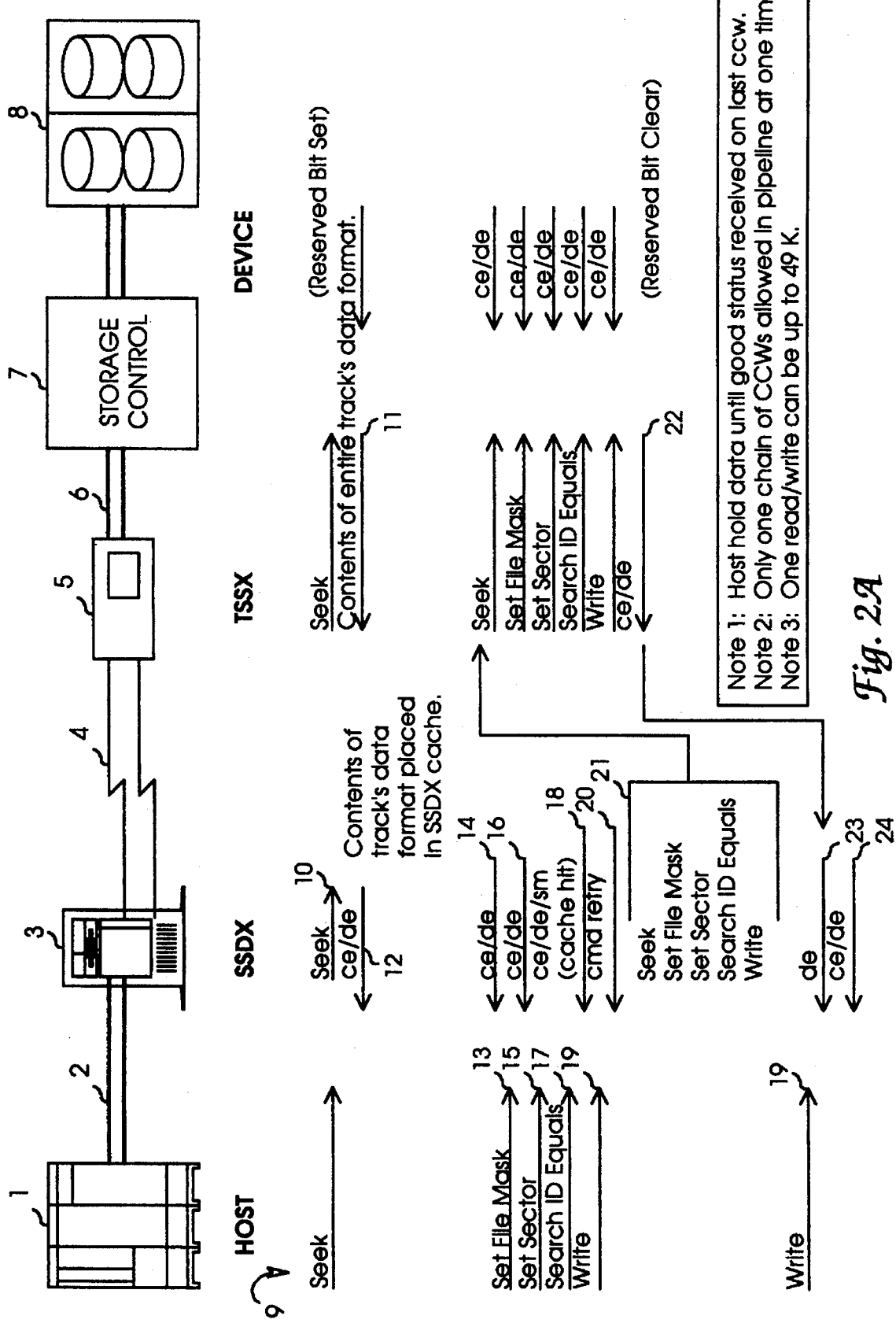
FIG. 2A is a flow diagram of a preferred sequence of commands for command processing of a Write command and count keyed data on the extended communications link according to the present invention.

FIG. 2A is a simplified diagram of a preferred sequence of commands for one mode of operation of the system: command processing of count keyed data (CKD) between the host 1 and peripheral 8 using extenders 3 and 5. The sequence shown in FIG. 2A is for a write sequence. The CCWs shown in the left-most column of FIG. 2A correspond to a channel program 9 for a write sequence. To initiate the sequence, host extender 3 receives an initial Seek command 10 from the host 1. The host extender 3 searches its cache 3D for the track format associated with the Seek command. If the cache 3D contains the track format, no additional processing is required to retrieve that format from the peripheral device.

Otherwise, if the track format is not resident within cache 3D, then the host extender 3 generates a channel program to obtain track format information from the peripheral device. The channel program preferably includes the Seek command as well as a Read Record 0 command, Read Multi-Count Keyed Data command, and Set File Mask command. The Set File Mask command may precede the Read Record 0 and Read Multi-Count Keyed Data commands. This channel program is also illustrated in element 82 of FIG. 7 (explained below). The host extender transmits the channel program, containing the Seek command, to the peripheral extender 5, over extended link 4. The peripheral extender 5 receives the channel program and, in turn, transmits it to storage control 7, which operates peripheral 8 to read the track 11 specified in the Seek command. The storage control 7 returns the entire contents of the track to the peripheral extender 5.

The peripheral extender 5 extracts the data format of the track and transmits it to the host extender 3, which stores it in cache 3D. The host extender 3 stores the format information 12 and returns a ce/de status to the host 1, thereby emulating the normal response of the storage control 7 to a Seek command.

The channel program 9 follows the Seek command 10 with a Set File Mask command 13 and Set Sector command 15. The host extender receives and stores these commands and responds to each with the ce/de status 14 and 16 respectively, emulating the normal response of the peripheral 8. The search ID Equals command 17 requires the host extender 3 to determine if the data location specified in the command 17 is located on the track that was specified in the seek command. The host extender 3 reads the data format 11 of the track stored in cache 3D, and responds to the Search ID Equals command 17 with a ce/de/sm (cache hit) status 18 if the data location is preset in the track. If the host extender 3 does not locate the particular data location within the format of the stored track format information, it can generate another channel program to obtain format information of additional (next) tracks. Alternatively, it may return a ce/de status to the host 1, which is not yet oriented, to indicate desired track offset; or, it may return the ce/de status if the host is attempting to search beyond current emulated track and the preceding Set File Mask command allows for a multi-track search. This channel program typically contains a Seek command, Set File Mask command, Read Record 0 command, and Read Multiple Count, Key, and Data commands. This channel program instructs the peripheral extender 5 to read another track from the peripheral device and extract the track format information.

Assuming the data location is verified by extender 3 by the ce/de/sm status 18, the channel program 9 next responds with a write command 19, which includes the data to be written to the peripheral 8. Extender 3 responds to the write command with a sm/ce/us (command retry) status 20, which causes the channel program 9 in the host 1 to wait for a de "unsolicited" status before it retries the write command. While the host 1 waits, the host extender 3 transmits a batch 21 of commands based on those received by extender 3. In this example, the entire sequence of commands received 10, 13, 15, 17 and 19 are forwarded to extender 5. Batch 21 is received by extender 5, which in turn forwards the commands in sequence to the control unit 7, emulating the operation of the host 1. Unit 7 and extender 5 then interact according to standard protocol. If the interaction results in a completed write operation, the extender 5 returns a ce/de status 22, or any other suitable designation of a completed data transfer, to extender 3. Extender 3 then transmits a de status 23 to the host 1. Host 1 reasserts the Write command 19 and forwards the write data. Having previously successfully completed the write operation, the extender 3 verifies that the Write command is resent by the host 1 and disregards any associated data and then responds with a ce/de status 24 to complete the write sequence.

Figure 2B:
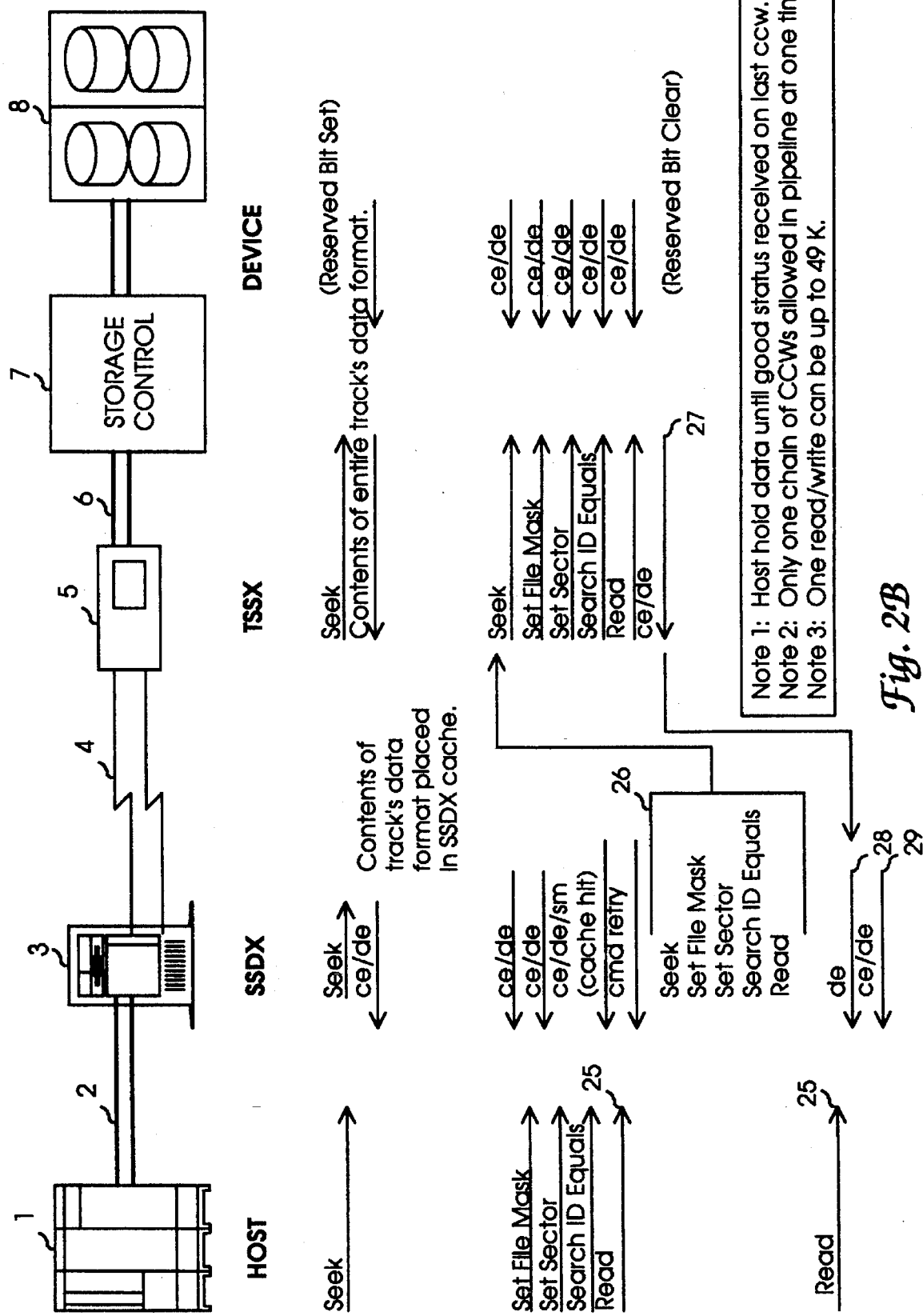
FIG. 2B is a flow diagram of a preferred sequence of commands for command processing of a Read command and count keyed data on the extended communications link according to the present invention.

The system of the present invention performs a read operation in a similar manner, except that the peripheral extender 5 retrieves the data once the location is identified and then transmits that data back to the host extender 3. This operation is illustrated in FIG. 2B. As shown in FIG. 2B, the difference between the execution of the read and write commands is that the host extender 3 receives a Read command 25 from the host 1. The host extender 3 transmits to the peripheral extender 5 this Read command, instead of a Write command, in batch 26. Batch 26 is received by peripheral extender 5, which in turn forwards the commands in sequence to the control unit 7, emulating the operation of the host 1. Unit 7 and peripheral extender 5 then interact according to standard protocol. If the interaction results in a completed read operation, the peripheral extender 5 returns a ce/de status 29, or any other suitable designation of a completed data transfer, to host extender 3. Host extender 3 then transmits a "unsolicited" de status 28 to the host 1. Host 1 reasserts the Read command 25 and receives the retrieved data. Having previously successfully completed the read operation, the host extender 3 verifies that the Read command is resent by the host 1 and disregards any associated data and then responds with a ce/de status 29 to complete the read sequence.

Thus, the system provides that the round-trip command/acknowledge cycle time is substantially reduced. For example, if each command/acknowledge operation in the protocol illustrated in FIG. 2A took 0.5 seconds to travel the entire distance between peripheral 8 and host 1 over link 4, the write command might take up to 2.5 seconds, excluding the time required to transfer data. With the system of the present invention, four round-trip handshakes are eliminated, reducing the time per transaction up to 2 seconds.

Figure 2C:
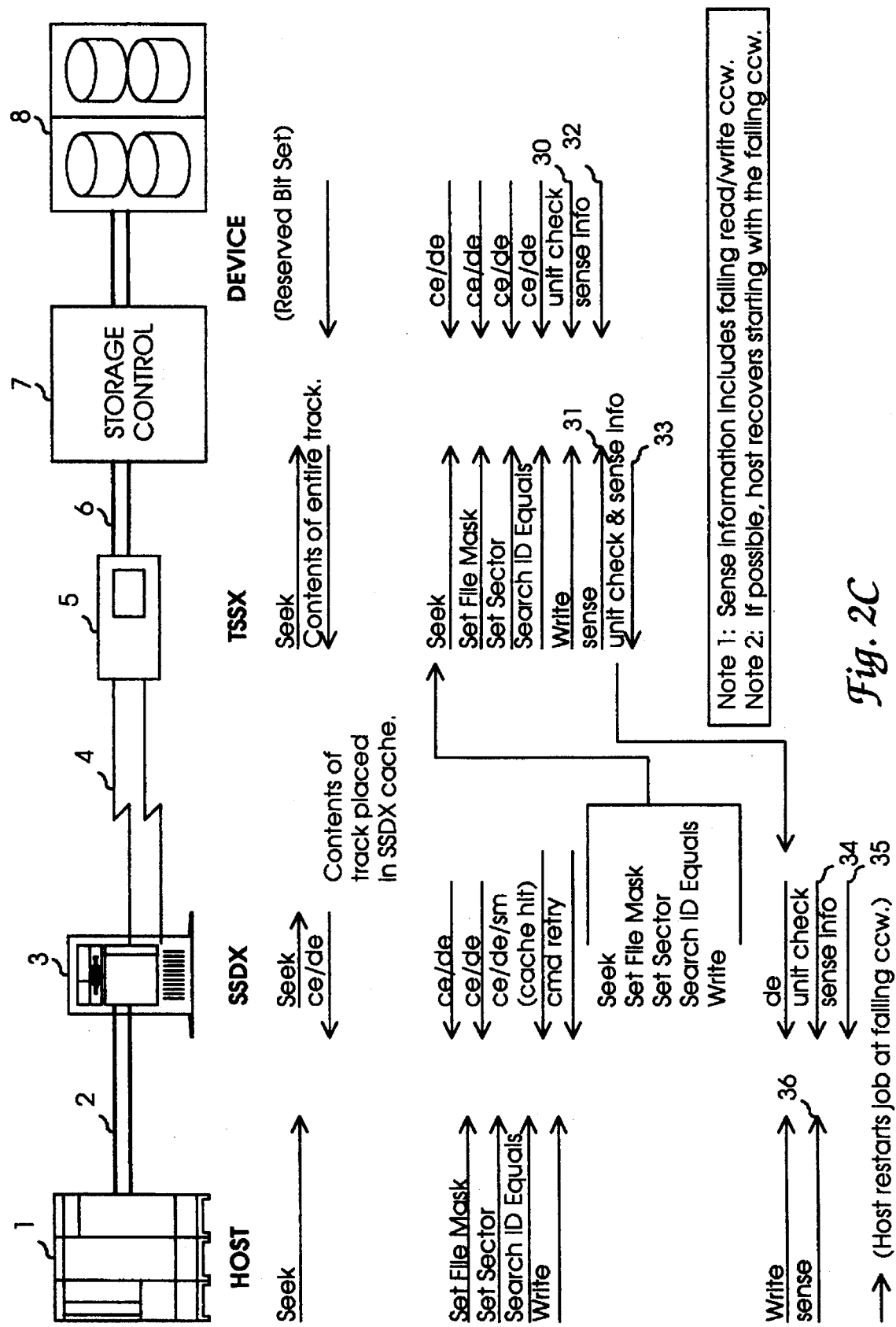
FIG. 2C is a flow diagram of a preferred sequence of commands for error recovery of count keyed data on the extended communications link according to the present invention.

FIG. 2C is a diagram of a general preferred sequence of commands between the host extender 3 and peripheral extenders 5 for error recovery of CKD. The sequence of commands in this case is identical to that of FIG. 2A, with the exception that an error in writing to the peripheral storage device causes unit check status 30 to be returned from storage control 7 to extender 5. In response, the peripheral extender 5 emulates the host 1 by transmitting a sense command 31, with the peripheral device 8 responding with sense information 32. The peripheral extender 5 transmits the unit check and sense information 33 to the host extender 3, which stores it in cache 3D. Next, extender 3 sends a de status to the host 1, prompting it to reassert the write command. Extender 3 then returns a unit check command 34 to the host 1, which responds with a sense command 36. Extender 3 then transmits the sense information 35 to the host 1. Finally, the host 1 uses the sense information to restart the I/O job at the appropriate failing command. This same error recovery procedure is applicable to any read operations as well.

EMULATION ROUTINE

Figure 3:
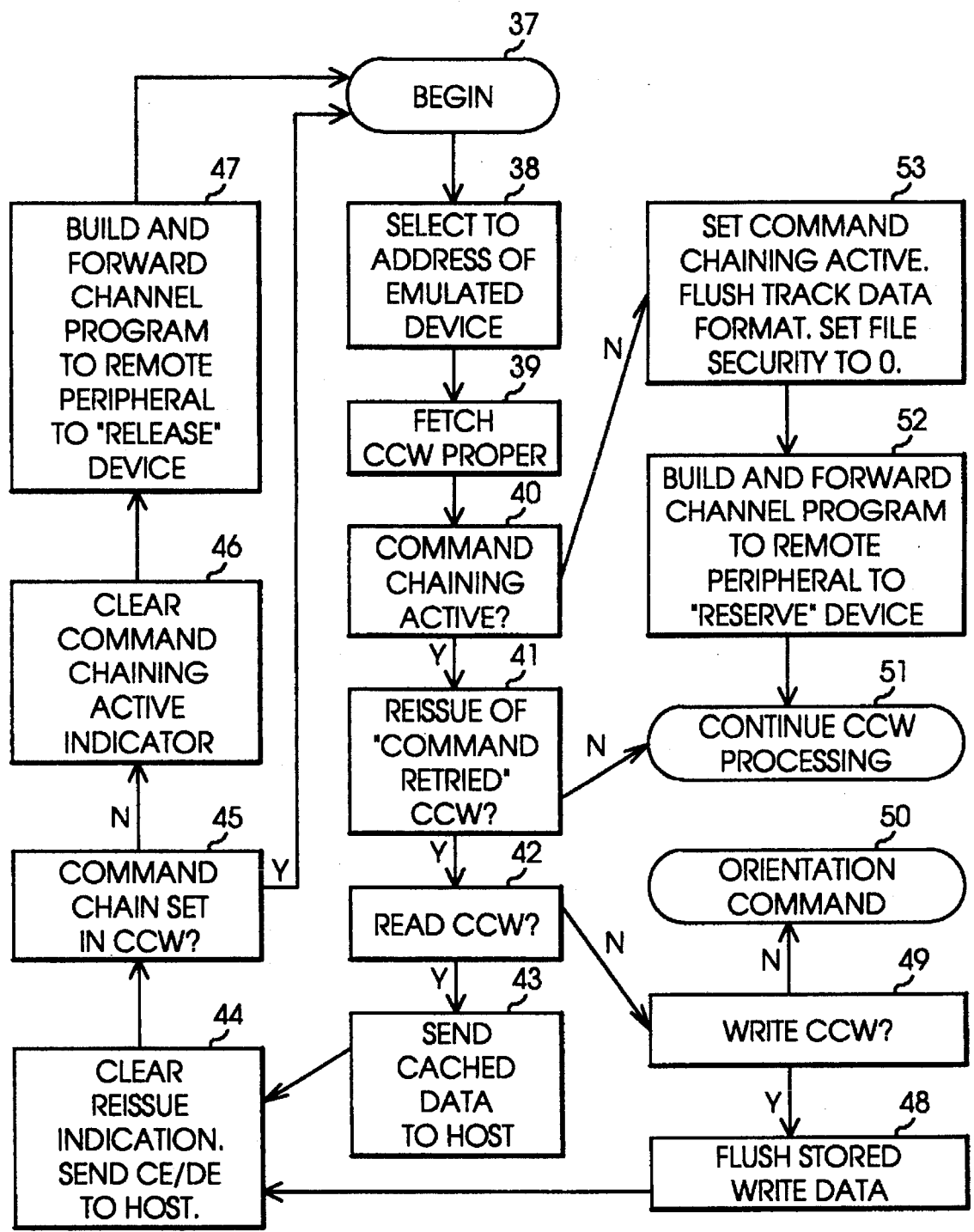
FIG. 3 is a flow chart for processing a channel command word (CCW) at the host extender according to the present invention.
Figure 4:
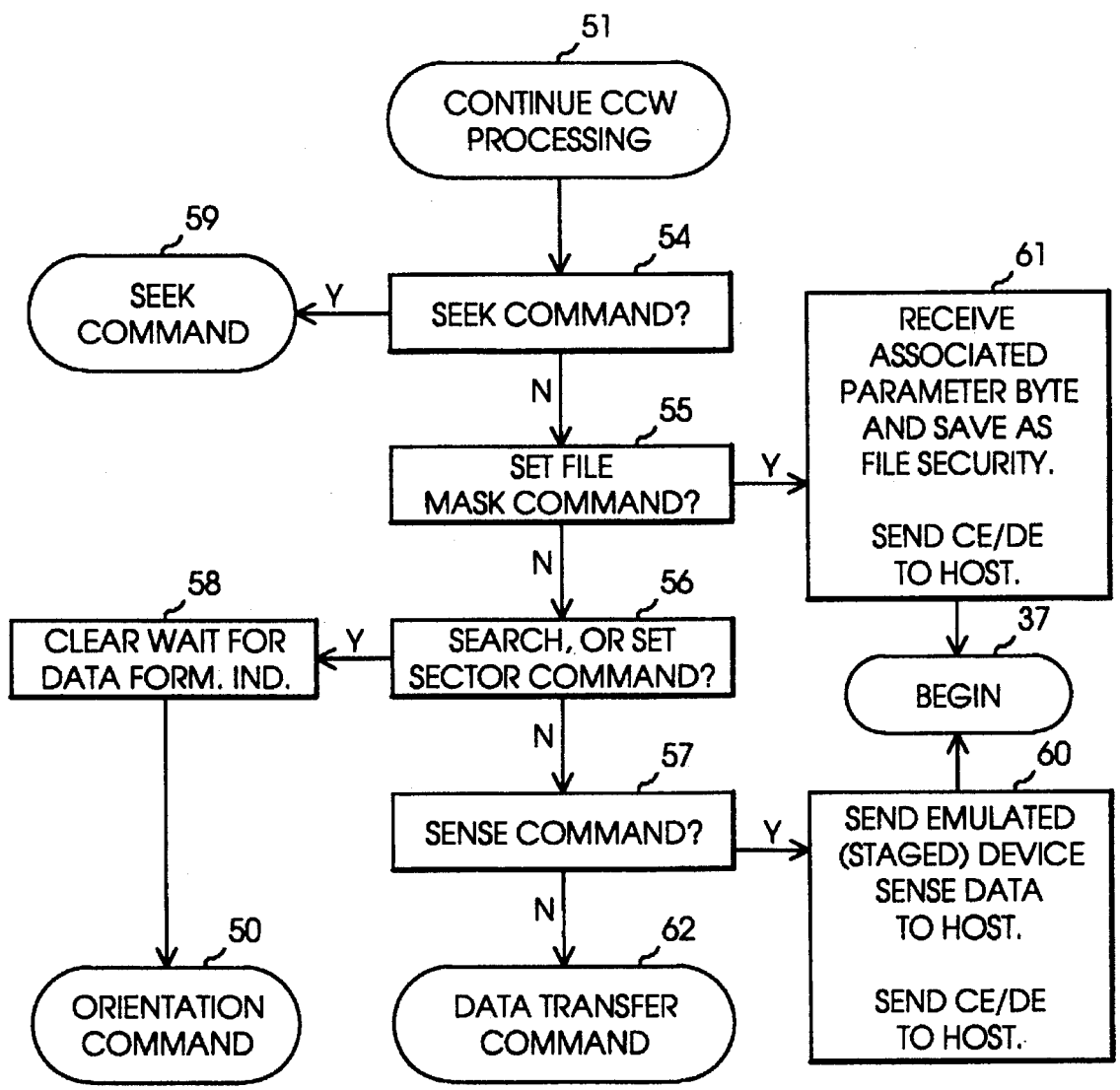
FIG. 4 is a flow chart for processing at the host extender CCW's that establish file security or read device sense information according to the present invention.

FIGS. 3–10 are flow charts of the operation of the host extender 3 and peripheral extender 5. FIG. 3 shows the operation of host extender 3 and, in particular, the operation of the extender 3 under control of software 3B, as executed in processor 3A, when a channel command word (CCW) received from host 1 is initially acted upon. The host extender 3 first selects the address of the desired peripheral device at step 38. This step involves selecting a peripheral channel/subchannel address from the host selected channel/subchannel address using the standard FIPS-60 protocol. The host extender 3 fetches the CCW from host 1 at step 39. If command chaining is not active, as determined at step 40, the host extender 3 sets the command chaining active at step 53 and then builds and forwards a channel program to the peripheral extender 5 at step 52. Otherwise, the host extender 3 determines at step 41 if the host has reissued a command that was initially rejected with command retry status; if not, the host extender 3 jumps to the continue CCW processing routine at step 51 (FIG. 4). If the host extender 3 reissued a command (command retry), it determines at steps 42 and 49 if the host 1 has retransmitted a Write or Read command. If the host 1 retransmitted a Write command, the host extender 3 flushes stored write data received with initial transmittal of write command now being retried at step 48. If the host 1 transmitted a Read command, the host extender 3 sends the cached data to the host at step 43. If the host 1 transmitted neither a Read nor Write command, the host extender 3 continues at processing for an Orientation command at step 50. Following step 48, or step 43, the host extender 3 clears a reissue indication and sends a ce/de status to the host 1 at step 44 to signify a successful completion of the command. Following the ce/de status, the host extender 3 checks the command chaining mode at step 45; if it is set, the host extender 3 returns to the beginning of the routine (37) to receive another CCW; otherwise, the host extender 3 clears the command chaining active indicator at step 46 and sends a channel program, at step 47, to the remote device in order to release the peripheral. The channel program of step 47 comprises a Device Release command, which is a single CCW. The Device Release command releases reserved control of the peripheral device to the "given host's" physical path(s) to that peripheral device. The "given host" in this example is the peripheral extender 5, since the peripheral extender 5 "appears" as the host 1 from the perspective of the peripheral device 8.

Figure 5:
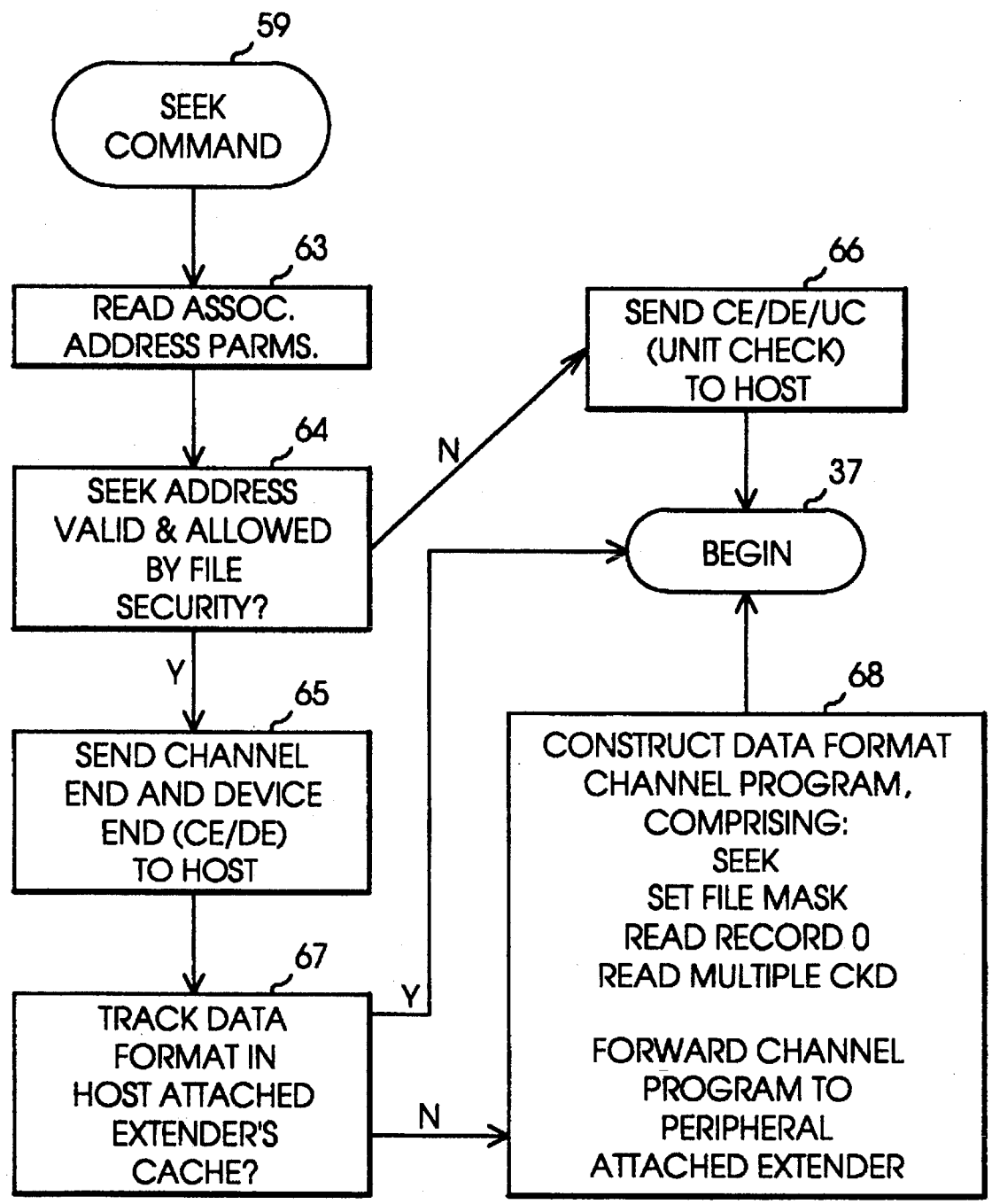
FIG. 5 is a flow chart for processing at the host extender CCW's that position to a given track of the device according to the present invention.
Figure 8:
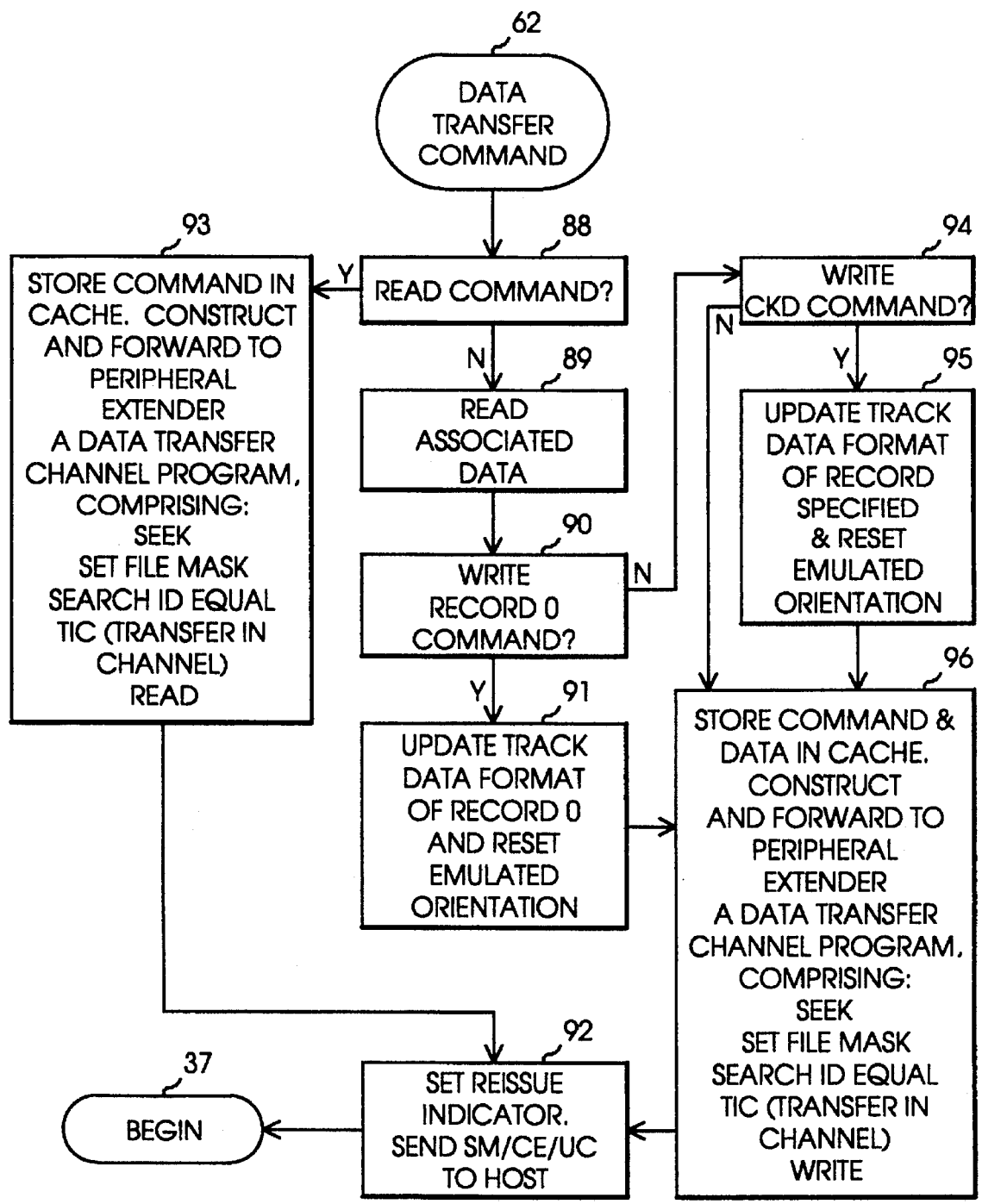
FIG. 8 is a flow chart for processing at the host extender CCW's that transfer data to or from the device according to the present invention.

FIG. 4 is a flow chart for additional processing of CCW's at the host extender 3. These CCW's establish file security or read device sense information. The host extender 3 determines at steps 54–57 whether the received command is a Seek, Set File Mask, Search, Set Sector, or Sense command. If the received command is a Seek command, the host extender 3 executes a routine 59 for processing the Seek command (FIG. 5). If the received command is a Set File Mask command, the host extender 3 at step 61 receives and saves the associated file security information and sends a ce/de status to the host 1 to signify completion of the command processing; the system then returns to the main routine (Begin 37, FIG. 3). If the received command is a Search or Set Sector command, the host extender 3 clears the "waiting for format data" at step 58 and then executes an Orientation command processing routine 50 (FIG. 6) to locate to the desired emulated position within the peripheral. If the received command is a Sense command, the host extender 3 at step 60 sends previously cached sense data and a ce/de status to the host 1; the system then returns to the main routine (Begin 37). If the received command was none of these commands, the host attached extender 3 executes a data transfer command processing routine 62 (FIG. 8).

FIG. 5 is a flow chart for the routine that processes a Seek command to locate a desired track within the peripheral device. After receiving the Seek command, the host extender 3 receives the associated address parameters at step 63. At step 64, the host extender 3 checks the desired address to ensure that it is a valid address within the peripheral. If the address is not valid, the host extender 3 sends a ce/de/uc (Unit Check) status to the host 1 at step 66 to indicate an error; the system then returns to the main routine (Begin 37). If the address is valid, the host extender 3 sends a ce/de status to the host at step 65 and then determines at step 67 if the host extender cache 3D contains the track format information for the desired address. If the host extender cache 3D contains the track format information, the system returns to the main routine (Begin 37). Otherwise, the host extender 3 generates a channel program and sends it to the peripheral extender at step 68 in order to retrieve the track format information for the desired address. After sending the channel program, the system returns to the main routine (Begin 37).

Figure 6:
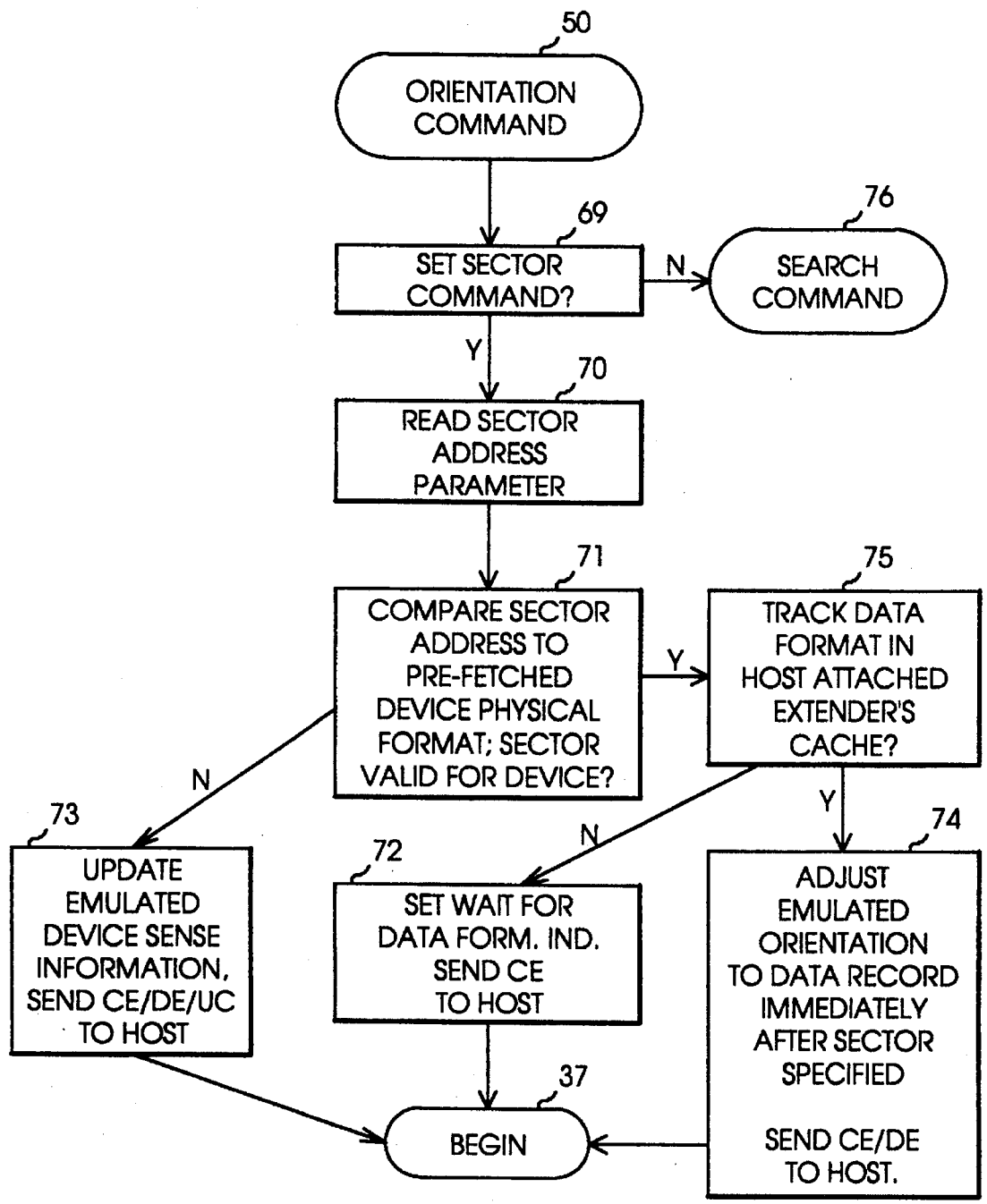
FIGS. 6 and 7 are a flow chart for processing at the host extender CCW's that orient positioning within a track of the device according to the present invention.

FIG. 6 is a flow chart for the routine that processes an orientation command to orient positioning within a track of the peripheral device. The host extender 3 first determines at step 69 if the received orientation command is a Set Sector command. If it is not a Set Sector command, the host extender 3 executes a routine for processing a Search command (76). Otherwise, for the Set Sector command, the host extender 3 reads the address parameters at step 70. At step 71, the host extender 3 compares the sector address specified by the received command with the pre-fetched physical format of the peripheral device to determine if the sector address is valid. If the sector address is not valid, the host extender 3 at step 73 sends a ce/de/uc status to the host to indicate an error. If the sector address is valid, the host extender 3 determines at step 75 if the host extender cache 3D contains the track format information for the desired address. If the host extender cache 3D does not contain the appropriate track format information, the host extender 3 at step 72 sends ace status to the host. This is referred to as a split status and sets a "waiting for format data" indicator. Otherwise, if the host extender cache 3D contains the appropriate track format information, the host extender 3 at step 74 locates the desired address location and sends a ce/de status to the host 1 in order to indicate a successful attempt to locate the emulated address. Step 74 provides the emulation of the peripheral device by using the track format information stored in the host extender cache 3D.

Figure 7:
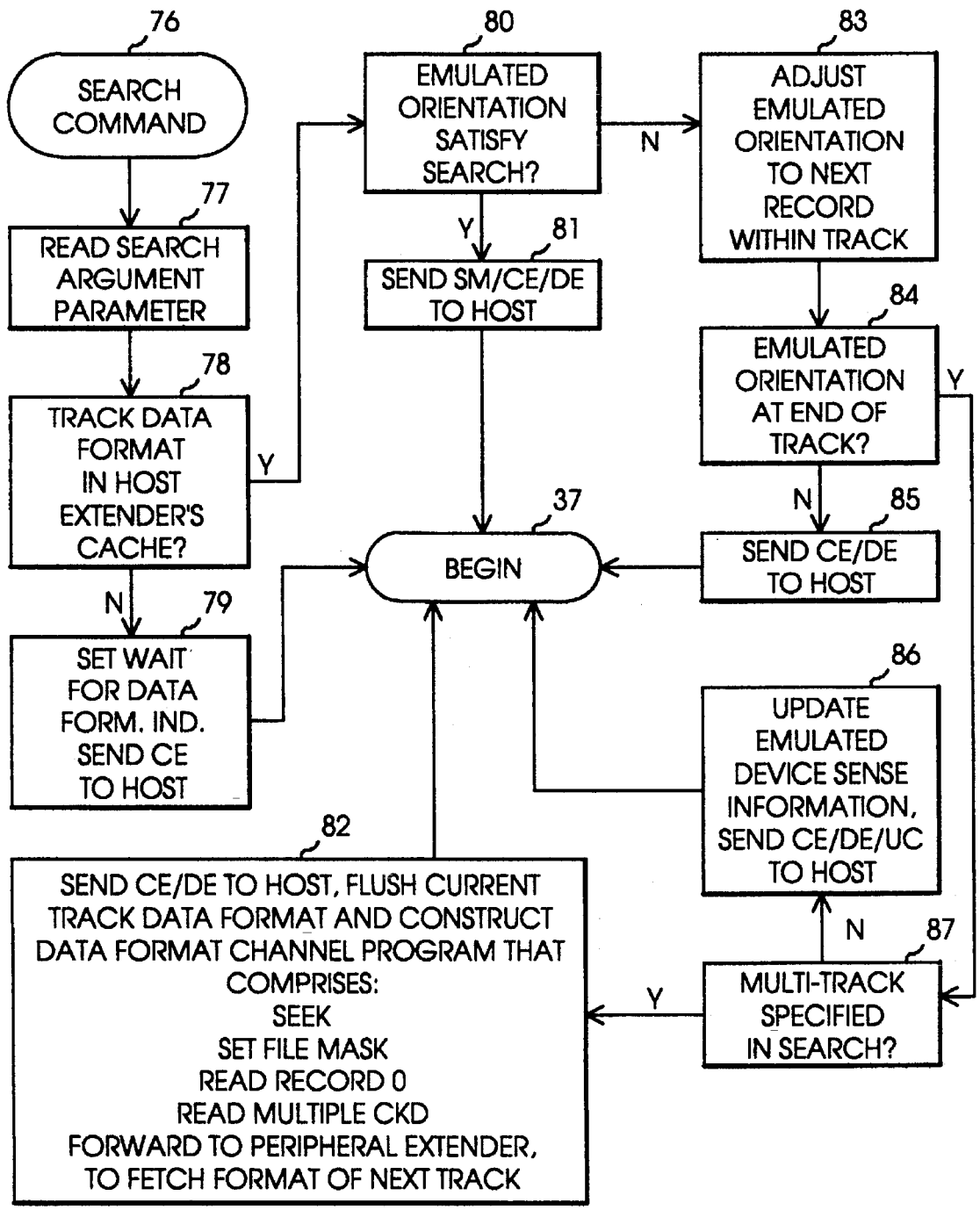

FIG. 7 is a flow chart for the routine that processes a Search command to orient positioning within a track of the peripheral device. At step 77, the host extender 3 reads the search argument parameters of the Search Command. The host extender 3 at step 78 checks to determine if the appropriate track data format information is in the host extender cache 3D. If the host extender cache 3D does not contain the appropriate track format information, the host extender 3 sends ace (split) status to the host 1 at step 79. If the host extender cache 3D contains the appropriate track format information, the host extender 3 performs the emulation of the peripheral to locate the desired address. At step 80, the host extender 3 determines if the address has been located; if the address was found, the host extender 3 at step 81 sends an sm/ce/de status to the host to indicate a successful completion of the command processing. If the address was not found, the host extender 3 at step 83 adjusts the emulated orientation to the next record of the track format information stored within the host extender cache 3D in order to continue searching. In order to continue the search, at step 84 the host extender 3 determines if the emulation has reached the end of the track or the last record in the track. If the emulation is at the end of the track, and the command specified a multi-track search (as determined at step 87), the host extender 3 generates another channel program, as specified by the commands in steps 82, and sends it to the peripheral extender in order to retrieve the track format information of the next track and continue the search. Otherwise, if a multi-track search was not specified, the host extender 3 at step 86 updates the device sense information and sends a ce/de/uc status to the host 1 in order to indicate an error. If the host extender 3 did not find the address and had not yet reached the end of the track, then it transmits at step 85 an ce/de status to the host 1 to indicate that it is not at the correct orientation.

FIG. 8 is a flow chart for the routine that processes a Data Transfer command, such as a read or write command. The host extender 3 typically executes the Search command processing routine first to find a desired location within the track format information stored within the host extender cache 3D and then executes a read or write command once the address has been found. At step 88, the host extender 3 determines if the data transfer command is a read or write command. If it is a read command, the host extender 3 at step 93 generates a channel program., which includes the read command, and sends it to the peripheral extender in order to retrieve the requested data. If the data transfer command is a write command, the host extender 3 at step 89 reads the associated data to be written to the peripheral device. At step 90 and 94, the host extender 3 determines if the write command is a Write Record 0 command or a Write CKD command. If the command is a Write Record 0 command, the host extender 3 at step 91 updates the track data format of record 0 and resets the emulated orientation. If the command is a Write CKD command, the host extender 3 at step 94 updates the track data format of the specified record and resets the emulated orientation. After steps 91 or 95, the host extender 3 at step 96 generates a channel program, which includes the write command and associated write data, and sends it to the peripheral extender in order to write the data to the peripheral device. Following step 93 for the read command, or step 96 for the write command, the host extender 3 at step 92 sets the reissue indicator and sends an sm/ce/uc status to the host 1 to indicate that the current command must be retried.

Figure 9:
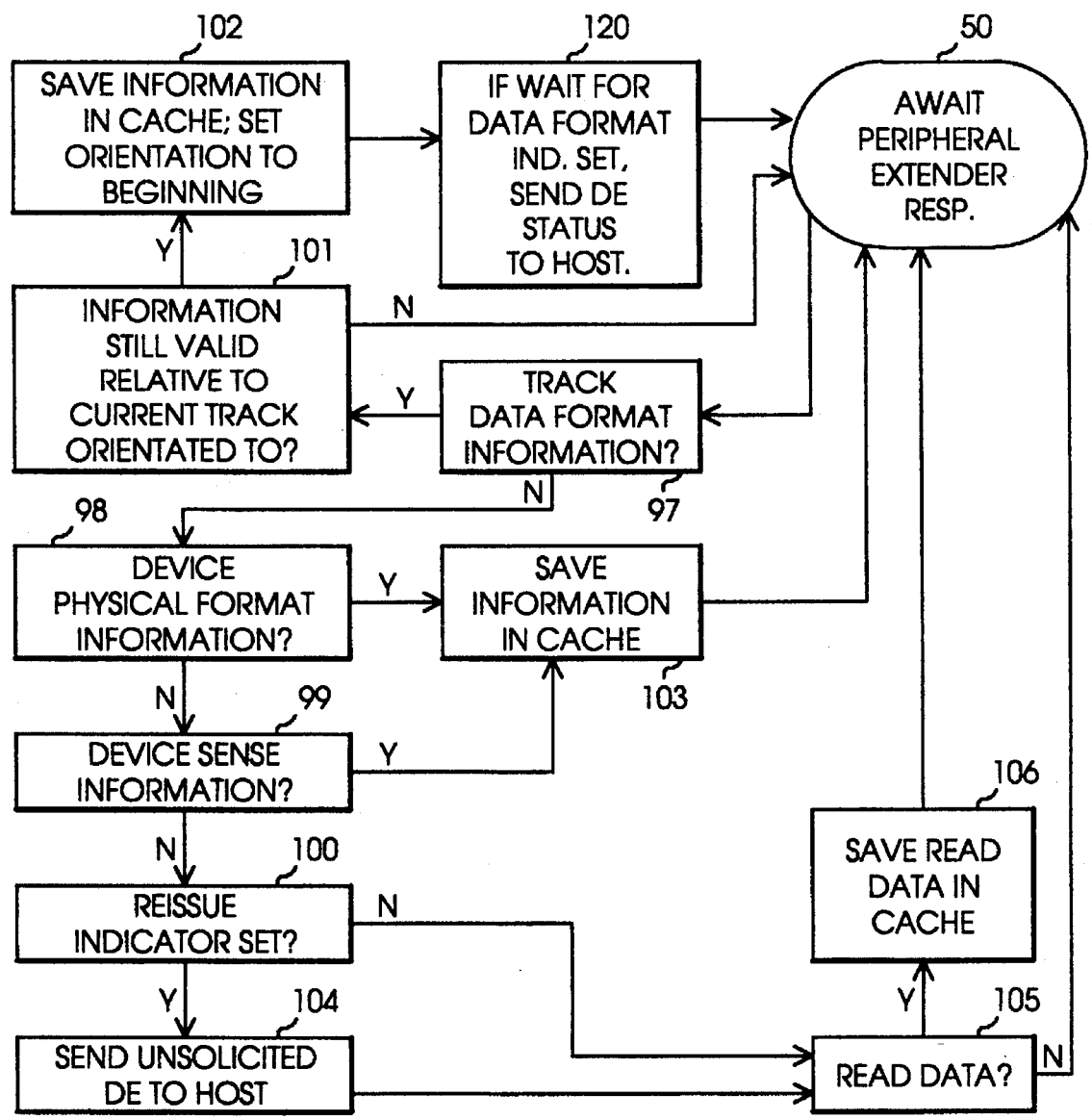
FIG. 9 is a flow chart for processing at the host extender in order to manage a transmitted response from the peripheral extender according to the present invention.

FIG. 9 is a flow chart for a routine that processes responses from the peripheral extender 5. At steps 97–100, the host extender 3 determines the type of information transmitted by the peripheral extender 5. If the peripheral extender 5 transmitted track data format information, the host extender 3 determines if the information is still valid at step 101. If the information is valid, the host extender 3 at step 102 stores the track data format information in the host extender cache 3D; and if the "waiting for format data" indicator is set, the host extender 3 presents "unsolicited" de status to the host 1 at step 120. The host extender 3, as explained above, uses this stored format information to emulate the peripheral device. If the peripheral extender 5 transmitted device physical format or sense information, the host extender 3 stores such information in the host extender cache 3D at step 103. If the reissue indicator had been set, the host extender 3 transmits an unsolicited de status to the host at step 104, indicating that the previous command can now be retried. If the host extender 3 determines at step 105 that read data had been transmitted, it stores the read data at step 106.

Figure 10:
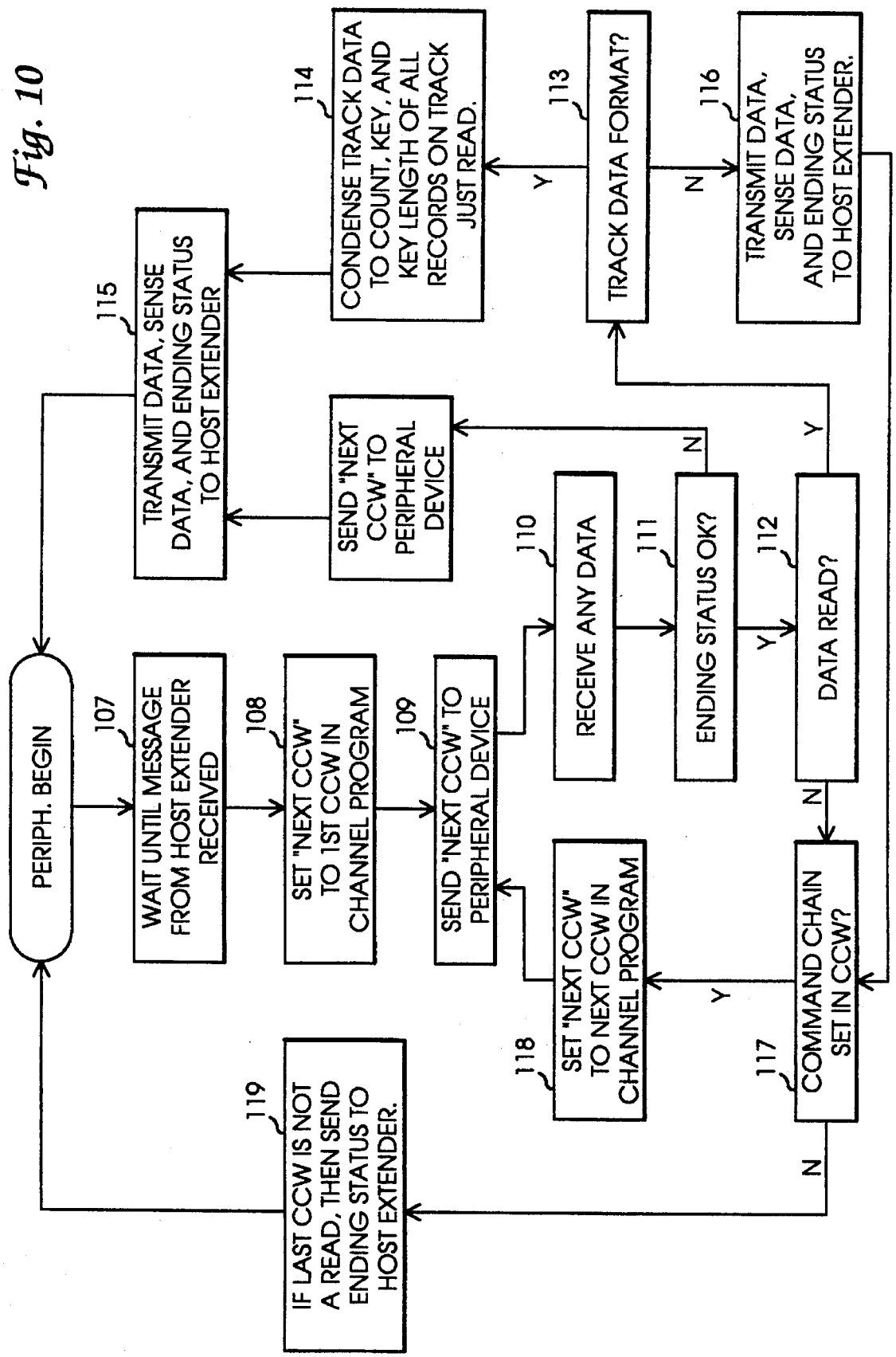
FIG. 10 is a flow chart for processing at the peripheral extender in order to manage a transmitted message from the host extender, which includes a channel program to be executed for the peripheral device according to the present invention.

FIG. 10 is a flow chart that shows the operation of peripheral extender 5 and, in particular, the operation of extender 5 under the control of software 5E executing in processor 5A, for processing a transmitted message from the host extender 3. At step 107, the peripheral extender 5 waits for a message from the host extender 3. Upon receiving a message or packet of information from the host extender 3, the peripheral extender 5 can store the message or packet in peripheral extender cache 5D. The peripheral extender 5 updates the channel program at step 108 and then transmits to the peripheral device (step 109) the next CCW within the sequence of CCWs forwarded to the peripheral extender 5 from the host extender 3. The peripheral extender 5 receives data, if available, at step 110 and then checks the ending status at step 111. If the peripheral extender 5 determines at steps 112 and 113 that it has received track data format information, it removes the actual data at step 114 and then transmits only the format information itself at step 115. If the peripheral extender 5 received data for a read command, it transmits the data to the host extender 3 at step 116. The peripheral extender 5 next determines if the command chain is set at step 117 and then updates the channel program at step 118 or alternatively transmits the data at step 119 if not already sent.

Thus, the present invention provides for substantially unlimited transparent extension of a peripheral from a host, while maintaining acceptable performance levels and avoiding the need for undesirable modification to the host software or the software of the peripheral controller. The transparent operation also permits the system to be easily and quickly installed.

While the present invention has been described in connection with the preferred embodiment thereof, it will be understood that many modifications will be readily apparent to those skilled in the art, and this application is intended to cover any adaptations or variations thereof. For example, the system may also operate with a non-compatible peripheral, in which case the peripheral device would typically be interfaced with another device for translating the protocol to a compatible format. It is manifestly intended that this invention be limited only by the claims and equivalents thereof.

What is claimed is:

1. A method of extending the operating distance between a host computer and a peripheral device, comprising the steps of:

(a) providing a host extender for communicating directly with the host computer;

(b) providing a peripheral extender for communicating directly with the peripheral device and connecting the host extender and the peripheral extender;

(c) obtaining data storage characteristics of the peripheral device in order for the host extender to emulate the peripheral device, comprising the steps of:

(1) generating a channel program in the host extender to read the data storage characteristics of the peripheral device;

(2) transmitting the channel program to the peripheral extender;

(3) the peripheral extender querying the peripheral device in accordance with the channel program;

(4) the peripheral extender receiving the data storage characteristics from the peripheral device;

(5) the peripheral extender transmitting the data storage characteristics to the host extender; and (6) the host extender storing the data storage characteristics in a host extender cache;

(d) the host extender receiving one or more channel commands from the host computer; and (e) the host extender responding to the host computer as if it were the peripheral device, based at least in part on the data storage characteristics of the peripheral device stored in the extender cache.

2. The method of claim 1 wherein the peripheral device is a disk drive.

3. The method of claim 1 wherein step (d) comprises the step of receiving a data transfer command.

4. The method of claim 1 wherein step (c)(3) further includes the steps of:

(a) the peripheral extender retrieving sense information from the peripheral device in response to receiving ending status from the peripheral device indicating an error;

(b) the peripheral extender transmitting the sense information to the host extender; and (c) the host extender receiving the sense information and storing the sense information in the host extender cache.

5. The method of claim 1 wherein step (d) further comprises the step of receiving file security information from the host computer and storing the file security information in the host extender cache.

6. The method of claim 1, further comprising the step of emulating device orientation of the peripheral device, comprising the steps of:

(a) the host extender receiving an orientation type command from the host computer;

(b) the host extender transmitting a request to the peripheral extender to reserve the peripheral device;

(c) if the channel command is a seek command and the desired location is valid, based on device physical characteristics, retained in the host extender cache, then the host extender transmitting channel end and device end status to the host computer;

(d) if the channel command is a search key type command, then the host extender executing a sequential search of records stored within the host extender cache for the desired location;

(e) if the channel command is a seek, search key or locate record type command and the desired location is not valid according to file security in the host extender cache, then the host extender transmitting channel end, device end and unit check status along with appropriate sense data, generated by the host extender, to the host computer when requested by the host computer with a sense command; and (f) if the channel command is a set sector, search key, or locate record type command and the desired location is valid according to file security in the host extender cache and a specified relative record address refers to a currently non-cached track, then the host extender removing any existing obsolete track data formation information from the host extender cache, generating a data format channel program, transmitting to the peripheral extender the data format channel program, and the host extender presenting ending status back to the host computer.

7. The method of claim 6 wherein step (f) further comprises the steps of:

(a) the host extender receiving notification from the peripheral extender, along with resulting ending status from a peripheral controller for the peripheral device, that the data format channel program processing is completed;

(b) the host extender notifying the host computer, by generating ending channel status, that the most recent command ended; and (c) the host extender receiving the next command from the host computer.

8. The method of claim 1, further comprising the step of initiating data transfer to the peripheral device, comprising the steps of:

(a) the host extender receiving from the host computer a channel program which contains a read or write command that specifies data transfer action to or from the selected peripheral device;

(b) the host extender storing information provided by the read or write command in the host extender cache;

(c) if the read or write command includes write data to be transferred to the peripheral device, then the host extender storing the write data in the host extender cache;

(d) the host extender referring to the track data format information and current device orientation in the host extender cache to gather:
(1) a remote data location in the peripheral device; and
(2) a remote data format of the peripheral device;

(e) the host extender generating a data transfer channel program and transmitting the data transfer channel program along with any associated write data to the peripheral extender; and (f) the host extender generating ending status for the data command that forces the host computer to command retry the data command at a later time.

9. The method of claim 8 wherein step (f) further comprises the steps of:

(a) the host extender receiving notification from the peripheral extender, along with resulting ending status from a peripheral controller for the peripheral device, that the data transfer channel program processing is completed;

(b) the host extender notifying the host computer, by generating appropriate channel status, that the most recent data command can be retried;

(c) the host computer receiving again the previously sent data command from the host computer;

(d) the host extender returning any pertinent data and channel status received from the peripheral extender after processing data transfer channel program; and (e) if the command is the last in the series of channel commands and all processing for the command is complete, then the host extender transmitting appropriate ending status to the host and transmitting a request to the peripheral extender that generates action in the peripheral device controller to release the peripheral device.

10. The method of claim 1, further comprising the step of initiating data transfer to the peripheral device, comprising the steps of:

(a) the host extender receiving from the host computer a channel program which contains a format write command, a command that reformats the track data format;

(b) the host extender storing information provided by the channel command in the host extender cache;

(c) The host extender updating the track data format information and current device orientation in the host extender cache to match that specified in the channel command;

(d) the host extender generating a channel program and transmitting the channel program to the peripheral extender; and (e) the host extender generating ending status for the channel command that forces the host computer to command retry the channel command at a later time.

11. The method of claim 10 wherein step (e) further comprising the steps of:

(a) the host extender receiving notification from the peripheral extender, along with resulting ending status from the peripheral controller, that the channel program processing is completed;

(b) the host extender notifying the host computer, by generating appropriate channel status, that the most recent channel command can be retried;

(c) the host extender receiving again the previously sent channel command from the host computer;

(d) the host extender returning any pertinent data and channel status received from the peripheral extender after processing data transfer channel program; and (e) if the command is the last in the series of channel commands and all processing for the command is complete, then the host extender transmitting appropriate ending status to the host computer and transmitting a request to the peripheral extender that generates action in the peripheral device controller to release the peripheral device.

12. The method of claim 1, further comprising the step of emulating sense data of the peripheral device, comprising the steps of:

(a) the host extender receiving a channel command of read sense from the host computer;

(b) the host extender constructing an appropriate device emulated sense data and returning the emulated sense data and an ending status of channel end and device end to the host computer.

13. A system for providing an extended communications link between a host computer and a peripheral data storage device, comprising:

host extender means, operatively coupled to the host computer and an extended communications link, for communicating with the host computer;

peripheral extender means, operatively coupled to the peripheral data storage device and the extended communications link, for communicating with the peripheral data storage device;

the host extender means comprising:
means for generating a channel program to obtain track format information from the peripheral device and for transmitting the channel program to the peripheral extender means; and host extender cache means for receiving and storing orientation commands and data commands from the host computer and for transmitting the orientation commands and data commands as a single packet of information across the extended communications link;

the peripheral extender means comprising:
means for receiving the channel program, obtaining format information of a selected track of the peripheral data storage device in response to the channel program, and for transmitting the format information to the host extender means; and peripheral extender cache means for receiving the packet of information from the host extender means and for sequentially transmitting the orientation commands and data commands to the peripheral data storage device; and the host extender means responding to the host computer as if it were the peripheral data storage device, based at least in part on data storage characteristics of the peripheral data storage device stored in the extender cache means.

* * * * *